(12) United States Patent
Yanover

(10) Patent No.: US 8,315,656 B2
(45) Date of Patent: Nov. 20, 2012

(54) METHOD AND DEVICES FOR BANDWIDTH ALLOCATION IN A WIRELESS COMMUNICATIONS SYSTEM

(75) Inventor: Vladimir Yanover, Kfar Saba (IL)

(73) Assignee: Alvarion Ltd., Tel-Aviv (IL)

( * ) Notice: Subject to any disclaimer, the term of this patent is extended or adjusted under 35 U.S.C. 154(b) by 1162 days.

(21) Appl. No.: 12/139,049

(22) Filed: Jun. 13, 2008

(65) Prior Publication Data

US 2008/0311941 A1 Dec. 18, 2008

(30) Foreign Application Priority Data

Jun. 13, 2007 (IL) .......................... 183904

(51) Int. Cl.
*H04B 7/00* (2006.01)
(52) U.S. Cl. ......... 455/509; 370/329; 370/235; 370/232
(58) Field of Classification Search ............... 455/404.1, 455/509, 7; 370/329, 338, 412, 395.21, 234, 370/316, 235, 232, 331
See application file for complete search history.

(56) References Cited

U.S. PATENT DOCUMENTS

| | | | |
|---|---|---|---|
| 5,239,676 A | 8/1993 | Strawczynski et al. | |
| 6,088,345 A | 7/2000 | Sakoda et al. | |
| 6,442,158 B1 * | 8/2002 | Beser | 370/352 |
| 6,940,842 B2 | 9/2005 | Proctor, Jr. | |
| 7,349,430 B1 * | 3/2008 | Chapman | 370/468 |
| 7,508,764 B2 * | 3/2009 | Back et al. | 370/235 |
| 2005/0176439 A1 | 8/2005 | Sasaki | |
| 2008/0080378 A1 * | 4/2008 | Kim et al. | 370/234 |
| 2008/0192752 A1 * | 8/2008 | Hyslop et al. | 370/395.21 |
| 2009/0029645 A1 * | 1/2009 | Leroudier | 455/7 |
| 2009/0186594 A1 * | 7/2009 | Kang et al. | 455/404.1 |
| 2012/0008596 A1 * | 1/2012 | Jung et al. | 370/331 |

FOREIGN PATENT DOCUMENTS

WO  2004054289 A1  6/2004

* cited by examiner

*Primary Examiner* — Sujatha Sharma
(74) *Attorney, Agent, or Firm* — Browdy and Neimark, PLLC

(57) ABSTRACT

A method is provided by the present invention for allocating channel resources in a wireless network. The method comprises: a) transmitting at least one message which comprises information that would allow association of at least one service flow for conveying data from/to a subscriber terminal, with at least one group of service flows; b) transmitting from a base station messages adapted to provide information which relate to the allocation of resources of a channel along which data will be transmitted to/from said subscriber terminal via one or more service flows associated with that at least one group of service flows, and wherein the information comprises an identification of the at least one group of service flows; and c) transmitting data from/to the subscriber terminal in accordance with the allocation of the channel resources for the at least one group of service flows.

7 Claims, 2 Drawing Sheets

METHOD AND DEVICES FOR BANDWIDTH ALLOCATION IN A WIRELESS COMMUNICATIONS SYSTEM

FIELD OF THE INVENTION

The present invention relates generally to digital wireless communications systems and methods of using them, and in particular, to the field of bandwidth allocation in wireless data communication networks.

BACKGROUND OF THE INVENTION

The publication "802.16™ IEEE Standard for Local and metropolitan area networks Part 16: Air Interface for Fixed Broadband Wireless Access Systems", published on Oct. 1, 2004 and its amendments e.g. IEEE 802.16e-2005 will be referred herein each and collectively as the "IEEE 802.16 publication". The disclosure of this reference is hereby incorporated herein by reference.

Bandwidth requesting/allocation mechanism specified in the IEEE 802.16 publication is optimized for the situation when data transmission demand appears/changes in a completely random manner. To keep the system latency reasonably small, a mechanism has been suggested, based on the usage of "MAP messages". This mechanism allows that within a short time interval (called "frame") the Base Station ("BS") can make a decision on allocating certain amount of bandwidth within the frame for service flows which initiated the data transmission demand.

Consequently, such a scheme requires that a MAP message be transmitted every frame. As MAP message is of a broadcast type of transmission, it will typically be transmitted over a control channel at the lowest possible rate so that all terminals in the cell will be capable of receiving it. Therefore, it appears that the MAP message is one of major elements of the MAC overhead. While MAP message for downlink (referred to in the IEEE 802.16 publication as "DL-MAP") typically allows for integrating transmissions directed to several terminals in a single transmission burst represented by a single element of DL-MAP, MAP message for uplink (UL-MAP) should explicitly specify transmission region for every terminal, so that the length of a UL-MAP is the most important element of the overhead. The length of a UL-MAP is roughly proportional to the number of service flows for which transmission slots are allocated in a single frame. This number is especially large in case where the transmissions from individual terminals are relatively small. One of the most important scenarios in which this problem can be demonstrated is in the case where there are many voice calls i.e. when many of terminals have VoIP packets ready for transmission.

SUMMARY OF THE INVENTION

It is therefore an object of the present invention to provide a novel method and device for reducing substantially the overhead in the control channel of a wireless data communication system.

It is another object of the present invention to provide a method and device for associating a service flow with a group of service flows for use in transmission of data in a wireless network.

Other objects of the invention will be described hereinafter.

In a wireless network comprising at least one base station and a plurality of subscriber terminals, a method is provided for allocation of channel resources which comprises the following steps:

a) transmitting at least one message which comprises information that would allow associating at least one service flow capable of conveying data from/to a subscriber terminal out of the plurality of subscriber terminals, with at least one group of service flows;
b) transmitting from the BS one or more messages providing information which relates to the allocation of the resources of the channel along which data will be transmitted to/from said subscriber terminal via one or more service flows belonging to the at least one group of service flows, and wherein the information comprises an identification of the at least one group of service flows;
c) transmitting data from/to the subscriber terminal in accordance with the allocation of channel resources to the at least one group of service flows.

According to a preferred embodiment of the invention, the at least one message transmitted in step a), comprises information to enable allocating the channel resources to the at least one service flow from among the resources allocated to the at least one group of which this at least one service flow is a member.

By yet another embodiment of the invention, the at least one message comprises information to allow identifying the resources allocated to a specific service flow within the allocation provided to the group of service flows of which that specific service flow is a member (e.g., set of OFDMA slots allowed for use by the specific service flow out of the overall set of OFDMA slots allocated for the group of service flows to which that specific service flow belongs).

According to another preferred embodiment of the invention, each of the service flows associated with a selected group of service flows has a periodic pattern of the transmission demand essentially identical to that of any other service flow associated with said selected group of service flows.

Also, as will be appreciated by those skilled in the art, the connections (service flows) in the group of service flows may be transmitted either with the same or with different physical layer parameters like modulation and channel coding, hence the present invention should not be considered as being limited to one of the above options.

Further, the terms "service flow", "connection" or "data connection" as used herein and throughout the present specification and claims, should be understood as interchangeable with each other. A single subscriber terminal can be associated with many service flows, of which some may be associated with a specific group of service flows while others—not.

According to a preferred embodiment of the invention, the identification of one or more of the service flows comprised within the at least one group of service flows is carried out by using an index which may be assigned/re-assigned when the one or more service flows are configured/re-configured.

According to another preferred embodiment of the invention, the information which allows identifying the resources allocated to specific service flow within the allocation provided to the group of service flows of which the said specific service flow is a member, is specified or changed when the one or more service flows are configured or re-configured.

By yet another preferred embodiment the properties of the at least one group of service flows include one or more of the following:
identifier of the at least one group of service flows; and
size of a single allocation per service flow.

In accordance with still another preferred embodiment of the invention, the at least one message transmitted in step b) is conveyed along the control channel and comprises information which relates to one or more of the following:
PHY layer properties of the transmission(s)
identification of the group
indication to which service flows in the group, are the resources actually allocated.

As this information is on a per-group of connections basis, it allows a considerable reduction of the amount of data transmitted over the control channel comparatively to the case where the information is on per-connection or per-terminal basis.

In accordance with yet another preferred embodiment, the at least one message of step a) comprises information that allows the BS to associate certain service flows with at least one specific group of service flows, is triggered by a backbone message(s) received from the infrastructure network or can be provisioned over the network management system. Then preferably, the BS and the SS exchange messages, to allow associating the service flow with the at least one group of service flows.

By another aspect of the present invention there is provided a base station (BS) for use in a wireless network which comprises:

a receiver capable of receiving information that allows associating at least one service flow for use in transmission of data to/from one or more subscriber terminals, with at least one group of service flows;
  a processor operative to associate based on available information related to one or more service flows, one or more service flows with at least one group of service flows (connections), and preferably provide an identification of one or more of the service flows comprised within the at least one group of service flows, and wherein the processor is further operative to allocate channel resources to one or more specific service flows associated with the at least one group of service flows;
  a transmitter operative to transmit to the one or more subscriber terminals:
    information that allows association of at least one service flow for transmission of data from and/or to a subscriber terminal out of the plurality of subscriber terminals, with at least one group of service flows;
    information (preferably real time information transmitted over the control channel) that relates to the allocation of channel resources to the group of service flows;
    and preferably, information that would allow identifying channel resources that have been allocated for the at least one service flow out of the resources allocated for the at least one group of service flows of which that at least one service flow is a member; and
    and wherein the base station is operative to transmit data to and/or to receive data from a plurality of subscriber terminals in accordance with the allocated channel resources for the at least one group of service flows and the resources allocated for the at least one service flow out of the resources allocated for the at least one group of service flows of which the at least one service flow is a member.

By another aspect of the present invention there is provided a subscriber terminal for use in a wireless network which comprises:

a receiver operative to receive from the base station:
  information that relates to the association of the at least one service flow and at least one group of service flows;
  information that relates to the allocation of channel resources to the at least one group of service flows; and
  data in accordance with the allocation made by the base station of the channel resources to the at least one group of service flows; and
  a transmitter operative to transmit data to the base station in accordance with the allocation made by the base station of the channel resources to the at least one group of service flows.

Preferably, the transmitter of the subscriber terminal is further operative to transmit to the base station information to allow the association of the at least one service flow and the at least one group of service flows and/or information that allows identifying channel resources allocated to a specific service flow within the resources allocated for the group of service flows to which that specific service flow belongs.

According to yet another preferred embodiment of this aspect of the invention, the subscriber terminal receiver is further adapted to receive information that relates to (e.g. allows identifying) the resources allocated for the at least one service flow associated with that subscriber terminal, out of the resources allocated for the at least one group of service flows of which the at least one service flow is a member. Preferably, the data received by the receiver in such a case is received also in accordance with the allocation of the channel resources for the at least one service flow out of the resources allocated to the at least one group of service flows.

According to another aspect of the invention, the subscriber terminal further comprises determination means operative to decide on the appropriate allocation of channel resources and transmission parameter(s) to be used by the subscriber terminal (e.g. time interval, frequency channel, set of sub-carriers, modulation, Forward Error Correction mode, repetition coding rate and the like) in order to transmit data to the base station, based on the information concerning the allocation of the channel resources to the at least one group of service flows and possibly on further information that allows identifying the resources to be allocated for the one or more service flows associated with that subscriber terminal, out of the channel resources allocated for the group of service flows to which the one or more service flows belong.

In accordance with a preferred embodiment of this aspect of the invention, the base station receiver is further capable of receiving information from the subscriber terminal(s) that would allow identifying the resources to be allocated for the one or more service flows associated with the corresponding subscriber terminal(s), out of the resources allocated to the group of service flows to which the one or more service flows belong.

In accordance with another preferred embodiment of this aspect of the invention, the subscriber terminal transmitter is further capable of transmitting information that would allow identifying the resources to be allocated for the one or more service flows associated with the subscriber terminal, out of the resources allocated to the group of service flows to which the one or more service flows belong.

DETAILED DESCRIPTION OF THE INVENTION

Figure 1:
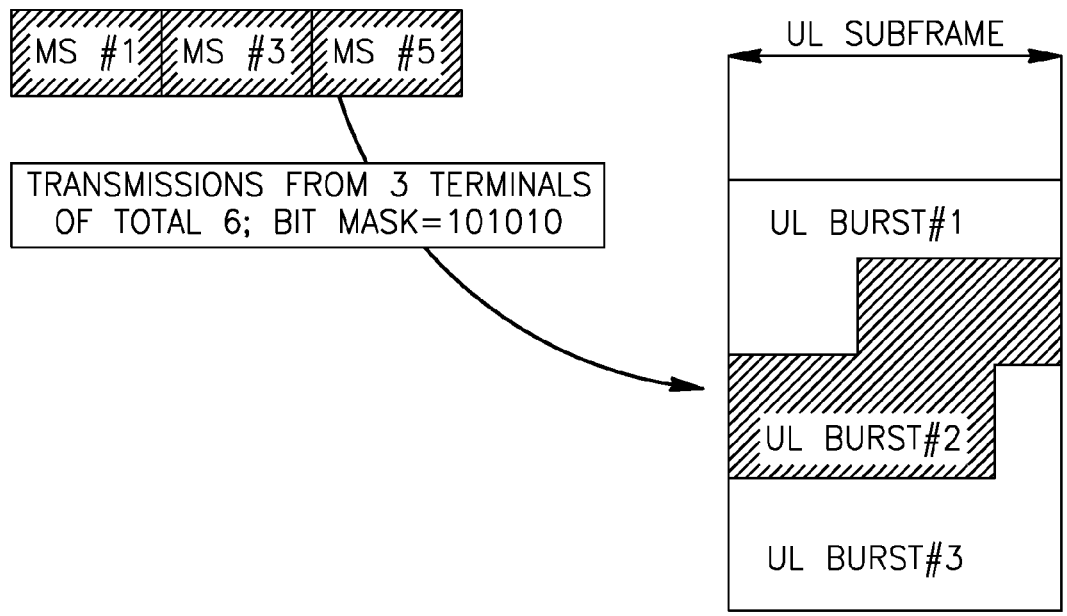
FIG. 1—illustrates the use of newly defined UL-MAP IE.

A better understanding of the present invention is obtained when the following non-limiting detailed description is considered in conjunction with the following figures.

Let us first consider the following preferred embodiment of the invention

In some cases the packets delivered over the service flow (connection) are of different sizes but still there is a limited set of options for the size of the packet. Then considerable reduction of the control channel overhead can be achieved for example by carrying out the following method.

Suppose there is a group of N connections with M possible options for the packet size $L_1, L_2, \ldots L_M$ (for example, for VoIP with silence suppression $L_1$ can be the length of VoIP packet with compressed voice while $L_2$ is the length of the packet during the silence period). Then M groups can be created with IDs=$GID_1$, $GID_2$, ... $GID_M$ with same set of connections, but with different values of the allocation size $L_1, L_2, \ldots L_M$.

Now, suppose that at a certain moment:

$N_1$ of total N connections need the allocation size $L_1$ bytes

...

$N_M$ of total N connections need the allocation size $L_M$ bytes

Then the following information elements shall be used in the control channel

One for $N_1$ terminals with ID=$GID_1$ and a bit mask with '1's corresponding to these $N_M$ terminals

...

One for $N_M$ terminals with ID=$GID_M$ and a bit mask with '1's corresponding to these $N_M$ terminals.

It is therefore provided in accordance with a first embodiment of the invention, that includes the following elements (terminology of 802.16 standard is used).

The definition of a group of service flows (connections) is implemented by using dynamic service addition (DSA) and/or dynamic service change (DSC) process that associate each relevant connection (service flow) with the group. The parameters communicated over the DSA (DSC) message exchange include at least one of the following:

ID of the connection and/or service flow

ID of the group (GID)

Size of a per-connection allocation in bytes

An index that identifies the service flow (connection) within the group; this index may be dynamically re-assigned over a DSC process Additional elements related to PHY like identification of HARQ channel The real time signaling on the allocation of channel resources to specific group of service flows is implemented by using a single information element of MAP message (all MAP options in 802.16 OFDM and OFDMA included) with the following information (particular implementation can use some or all of the parameters below)

Value of CID field identical to the GID as defined in relevant DSA (DSC) messages DIUC or UIUC Parameters of the allocation in PHY specific terms; particularly for UL connections for OFDMA PHY this is the number of OFDMA slots An optional bit mask to indicate to which service flows in the group the resources are actually allocated; position of the bit corresponding to specific service flow is a function of the index of the service flows specified in relevant DSA (DSC) messages. Absence of the bit mask means that allocation is for all service flows in the group.

In accordance with yet another embodiment of the invention the definition of a group of service flows is implemented over MCA ("MultiCast Assignment") messages carrying same information as specified above.

Let us now consider the following examples of implementing the present invention:

Extension of CID Meaning

CID values used in (all types of) IEEE 802.16 MAPs are GID=Group ID in addition to SS's Basic CID, broadcast or multicast CID.

New DSA/DSC TLV ("Type-Length-Value")—Group Allocation Parameters

New DSA/DSC TLV—Group Allocation Parameters are introduced for encoding parameters for group allocations. The TLV preferably includes the following parameters ID of the group (GID) to which the connection is assigned Length of allocation in bytes Index of the connection within the group The following is an example of the format of the TLV

| Type | Length | Value | Scope |
|------|--------|-------|-------|
|      | 6      | Bits 0:15 - ID of the group (GID) to which the connection is assigned<br>Bits 16:31 - length of allocation in bytes<br>Bits 32:47 - index 0-based, of the connection within the group | DSA-REQ, DSA-RSP DSC-REQ, DSC-RSP |

New UL-MAP Information Element (IE) is Introduced

New UL-MAP Information Element (IE) is introduced to signal to the terminals the allocation of new type—Group allocation. The IE includes the following parameters:

| | |
|---|---|
| PHY parameters of the transmission: | Examples: UIUC and Repetition coding indication |
| GID: | Group ID. |
| Allocation Size: | Total size of a single per-connection allocation in bytes. |
| Mask: | An optional bit mask to indicate to which service flows in the group the resources are actually allocated; absence of the mask means that the resources are allocated to all connections. |

After receiving this IE, each subscriber terminal having connections that belong to the group identified by GID, shall decide whether it is allowed to transmit the data on each of the connections or not, and if in the affirmative, in which OFDMA slots.

First, the SS will check if the GID value was previously defined for the SS as Group ID in Group Allocation Parameters TLV in DSA-REQ/RSP or DSC-REQ/RSP transaction. In case it was not, the SS shall ignore the IE.

Next, the SS shall check the value of the bit in Mask, which corresponds to the connection. This is the bit with the number equal to the Index value in Group Allocation Parameters TLV. The bits in the Mask field are numbered starting from 0, in the order the bytes are transmitted, in each byte starting from the MSB.

Then, the SS shall calculate the number S of OFDMA slots for each MS connection that belongs to the group based on one or more of the following:

Length of allocation value specified in Group Allocation Parameters TLV

UIUC value

Repetition rate

The subscriber terminal shall count number J of bits equal to '1' before the bit corresponding to the connection. The SS shall use for transmission of the connection data the slots from S*J to S*(J+1)−1 inclusively.

The following is an example of the format of new UL-MAP IE:

| Syntax | Size | Notes |
|---|---|---|
| Group_UL_Allocaton_IE( ) { | — | |
| Extended-2_UIUC | 4 bits | =0x05 |
| UIUC | 4 bits | One of the values 1-10 that denotes certain burst profile |
| Length | 8 bits | Variable |
| GID | 16 bits | Group ID |
| Repetition coding indication | 2 | 0b00 - No repetition coding<br>0b01 - Repetition coding of 2 used<br>0b10 - Repetition coding of 4 used<br>0b11 - Repetition coding of 6 used |
| Reserved | 2 | |
| Length | 12 | Total size of a single allocation in bytes |
| Mask | Variable, multiple of 8 bits | A bit mask to indicate to which service flows in the group the resources are actually allocated; absence of the mask means that the resources are allocated to all connections |
| Mask | Variable, multiple of 8 bits | A bit mask to indicate to which service flows in the group the resources are actually allocated; absence of the mask means that the resources are allocated to all connections |
| } | | |

Reference is now made to FIG. 1 illustrating the use of a newly defined UL-MAP IE in a cell of a wireless network including for example a group with GID=17 of six mobile terminals. According to the embodiment illustrated in FIG. 1, the IE includes a bit mask '101010' identifying three terminals, MS#1, MS#3 and MS#5, which belong to the group. The bit mask has '1' at the locations that indicate those terminals that transmit within UL Burst #2, MS#1, MS#3 and MS#5, while '0' indicates a terminal that belongs to the group but does not transmit within that burst, MS#2, MS#4 and MS#6.

Figure 2:
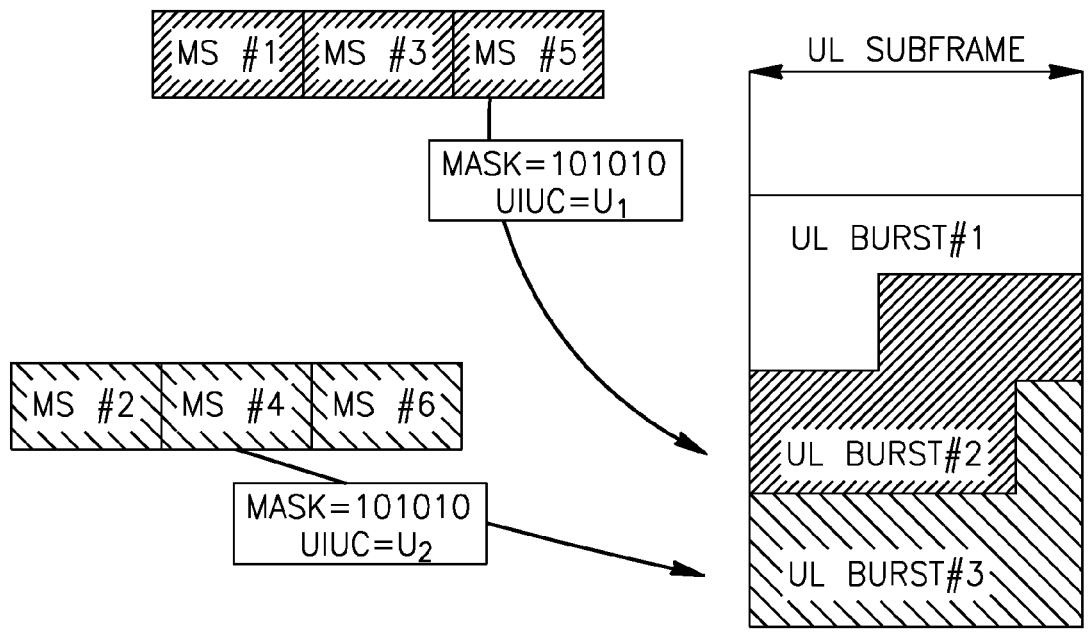
FIG. 2—illustrates the usage of two UL-MAP IEs with different UIUC values.

FIG. 2 illustrates the usage of two UL-MAP IEs for six terminals, MS#1 to MS#6, which belong to the group with GID=17 but use two different UIUC values. As shown in FIG. 2 each IE includes a bit mask for identifying terminals transmitting within the corresponding UL burst with certain UIUC. A first IE includes the bit mask '101010' identifying the three terminals MS#1, MS#3 and MS#5 that transmit within UL Burst #2 with UIUC=1, while the other IE includes the bit mask '010101' identifying three terminals MS#2, MS#4 and MS#6 that transmit within UL Burst #3 with UIUC=2.

Regular UL-Map Information Element (IE) May be Used

Regular UL-MAP Information Element (IE) may be used to signal a group allocation with CID=GID; the meaning of which is equivalent to that of new UL-MAP Information Element in case the mask is absent which means that the resources are allocated to all connections in the group.

Figure 3:
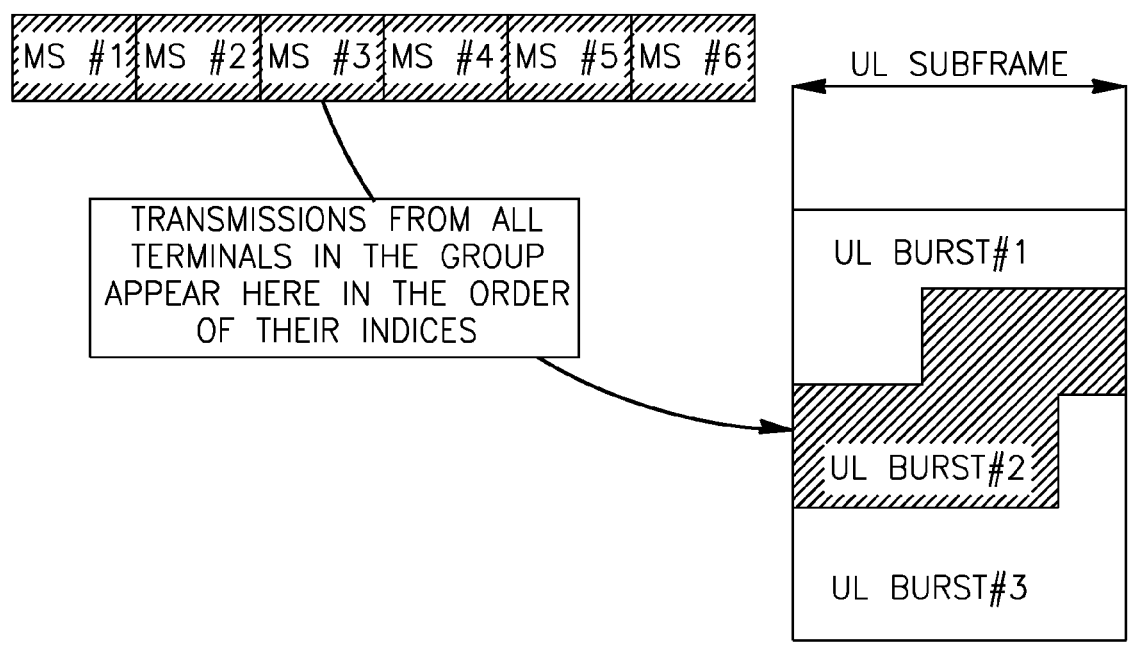
FIG. 3—illustrates the usage of regular UL-MAP IE.

Let us consider the example illustrated in FIG. 3 where a regular UL-MAP IE is used with CID value identical to the GID (Group ID)=17 in which case all terminals, MS#1 to MS#6, that belong to the group transmit within UL Burst #2.

As will be appreciated by those skilled in the art, the examples provided herein show the use of the method and devices proposed by the present invention. However, similar processes may be applied in a similar way for example when the entity determining the allocation of the resources is a base station, subscriber terminal(s) or a combination thereof, all without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. In a wireless network comprising at least one base station and a plurality of subscriber terminals, a method is provided for allocating channel resources, which method comprises the following steps:
   a) transmitting at least one message which comprises information that would allow associating at least one service flow for use in conveying data from/to a subscriber terminal out of said plurality of subscriber terminals, with at least one group of service flows;
   b) transmitting from said base station one or more messages adapted to provide information which relates to the allocation of resources of a channel along which data will be transmitted to/from said subscriber terminal via one or more service flows associated with said at least one group of service flows, and wherein the information comprises an identification of the at least one group of service flows; and
   c) transmitting data from/to said subscriber terminal in accordance with the allocation of channel resources for the at least one group of service flows,
   wherein each of the service flows associated with a selected group of service flows has a periodic pattern of a transmission demand essentially identical to that of any other service flow associated with said selected group of service flows.

2. A method according to claim 1, wherein said at least one message transmitted in step b), comprises information to enable allocation of channel resources to said at least one group of service flows.

3. A method according to claim 1, wherein said at least one message transmitted in step a), comprises information to enable allocating channel resources to said at least one service flow from among the resources allocated to said at least one group of which said at least one service flow is a member.

4. A method according to claim 1, wherein identification of one or more service flows is carried out by using an index assigned when the one or more service flows are configured.

5. A method according to claim 1, wherein the properties of said at least one group of service flow comprise one or more members of the group consisting of: identification of the at least one group of service flows and size of a single allocation per service flow.

6. A method according to claim 1, wherein said at least one message transmitted in step b) comprises information which relates to one or more of the following:
   PHY layer properties of the transmission(s);
   identification of the group;
   indication related to which of the service flows in said at least one group of service flows, are the resources actually allocated.

7. A base station for use in a wireless network which comprises:
   a receiver capable of receiving information that allows associating at least one service flow for use in conveying data to and/or from one or more subscriber terminals, with at least one group of service flows, wherein each of the service flows associated with a selected group of service flows has a periodic pattern of a transmission demand essentially identical to that of any other service flow associated with said selected group of service flows;

a processor operative to associate based on available information related to one or more service flows, said one or more service flows with at least one group of service flows, and wherein said processor is further operative to allocate channel resources to one or more service flows associated with said at least one group of service flows;

a transmitter operative to transmit to said one or more subscriber terminals:

information that allows association of at least one service flow for transmission of data from and/or to a subscriber terminal out of the plurality of subscriber terminals, with at least one group of service flows; and information that relates to the allocation of channel resources to the group of service flows; and information that allows identifying said at least one group of service flows;

wherein said base station is operative to transmit data to and/or receive data from a plurality of subscriber terminals in accordance with channel resources allocated for said at least one group of service flows and channel resources allocated for said at least one service flow out of said channel resources allocated for the at least one group of service flows of which said at least one service flow is a member.

* * * * *